(12) United States Patent
Heaslip et al.

(10) Patent No.: US 9,573,178 B2
(45) Date of Patent: Feb. 21, 2017

(54) SPLIT RING AND METHOD OF USING IMPROVED SPLIT RING TO ASSEMBLE A ROLL

(71) Applicant: NOVELIS INC., Atlanta, GA (US)

(72) Inventors: Christopher Heaslip, Oswego, NY (US); Timothy Southworth, Fulton, NY (US); Mike Somers, Hannibal, NY (US); Rodney Buskey, Oswego, NY (US); Erin Nalle, Oswego, NY (US); Lewis Laclair, Oswego, NY (US); David McCloud, Liverpool, NY (US)

(73) Assignee: Novelis Inc., Atlanta, GA (US)

( * ) Notice: Subject to any disclaimer, the term of this patent is extended or adjusted under 35 U.S.C. 154(b) by 187 days.

(21) Appl. No.: 14/609,535

(22) Filed: Jan. 30, 2015

(65) Prior Publication Data

US 2016/0221054 A1  Aug. 4, 2016

(51) Int. Cl.
*B21B 31/08* (2006.01)
*F16C 13/00* (2006.01)

(52) U.S. Cl.
CPC ............ *B21B 31/08* (2013.01); *F16C 13/00* (2013.01)

(58) Field of Classification Search
CPC ...... B21B 31/02; B21B 31/08; B21B 2203/28; B21B 2203/30
USPC ............................ 29/898.07, 898.08, 898.09
See application file for complete search history.

(56) References Cited

U.S. PATENT DOCUMENTS

| 4,136,989 A | * | 1/1979 | Bianco | B21B 31/07 384/585 |
| 5,411,337 A | * | 5/1995 | Bianco | B21B 31/07 384/519 |
| 6,132,101 A | * | 10/2000 | Landy, III | B21B 31/07 384/559 |
| 6,415,489 B1 | * | 7/2002 | Martins | B21B 31/074 29/252 |
| 6,892,562 B2 | * | 5/2005 | Gethings | B21B 31/07 384/556 |
| 7,500,374 B2 | * | 3/2009 | Martins | B21B 31/074 72/237 |
| 7,909,516 B2 | * | 3/2011 | Hewitt | F16C 35/073 29/525.11 |
| 8,021,055 B2 | * | 9/2011 | Bradshaw | B21B 31/074 384/556 |

* cited by examiner

*Primary Examiner* — Jason L Vaughan
(74) *Attorney, Agent, or Firm* — Kilpatrick Townsend & Stockton LLP

(57) ABSTRACT

A split ring for use in assembling a bearing retainer onto a roll. The split ring helps keep a mounting jack in compression with the bearing retainer as the mounting jack compresses the bearing retainer onto the roll. In some embodiments, the split ring includes a plurality of apertures that are each configured to receive a drive mechanism that helps collapse the mounting jack to allow for removal of the split ring and the mounting jack once the bearing retainer is assembled onto the roll.

5 Claims, 3 Drawing Sheets

SPLIT RING AND METHOD OF USING IMPROVED SPLIT RING TO ASSEMBLE A ROLL

TECHNICAL FIELD

The present disclosure generally relates to assembling rolls for use in rolling mills and more specifically to split rings for helping assemble such rolls.

BACKGROUND

Rolling is a metal forming process in which stock sheets or strips are passed through at least one pair of rolls. Some rolling mills include backup rolls that provide rigid support to the work rolls and therefore allow the diameter of the work rolls to be reduced. Each roll includes one or more bearings to reduce friction as the roll rotates. The bearings can be housed in a bearing retainer or chock. In some cases, a jack or other drive mechanism is used to compress the bearing retainer onto the roll as the roll is assembled or serviced. To keep the jack in compression with the bearing retainer, a split ring is sometimes positioned between the jack and the end of the roll. The split ring acts as a back stop and maintains compression between the jack and the bearing retainer as the bearing retainer is assembled onto the roll.

However, it is typically difficult and very labor intensive to collapse the jack and remove the split ring from the assembly once the jack has been extended. In some instances, crowbars are manually wedged between the jack and the split ring to release the pressure between the jack and the split ring and force the jack to collapse and allow for removal of the split ring. In one particular example, two crowbars are wedged between the split ring and the jack and two workers manually apply force to the crowbars to collapse the jack. Due to the forces involved, along with slick flooring in a typical rolling mill, additional operators are needed to stabilize those operating the crowbars to reduce the risk of slipping and injury. Overall, the process is dangerous, time consuming, labor intensive, and inefficient.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Aspects of the present disclosure relate to an improved split ring that allows for easier and safer collapsing of a jack used to assemble a roll, such as a work roll or back up roll. Also disclosed are methods of using the improved split ring to collapse the jack during assembly of a roll.

BRIEF DESCRIPTION OF THE DRAWINGS

Illustrative embodiments of the present disclosure are described in detail below with reference to the following drawing figures.

DETAILED DESCRIPTION

Certain aspects and features of the present disclosure relate to split rings used to help assemble and replace/service a roll, such as a work roll, back up roll or any other kind of roll. Specifically, the disclosed split rings can be used to help assemble a bearing retainer containing a plurality of bearings onto an end of the roll. Also disclosed are methods of using the disclosed split rings to assemble or replace or service a roll.

Figure 1:
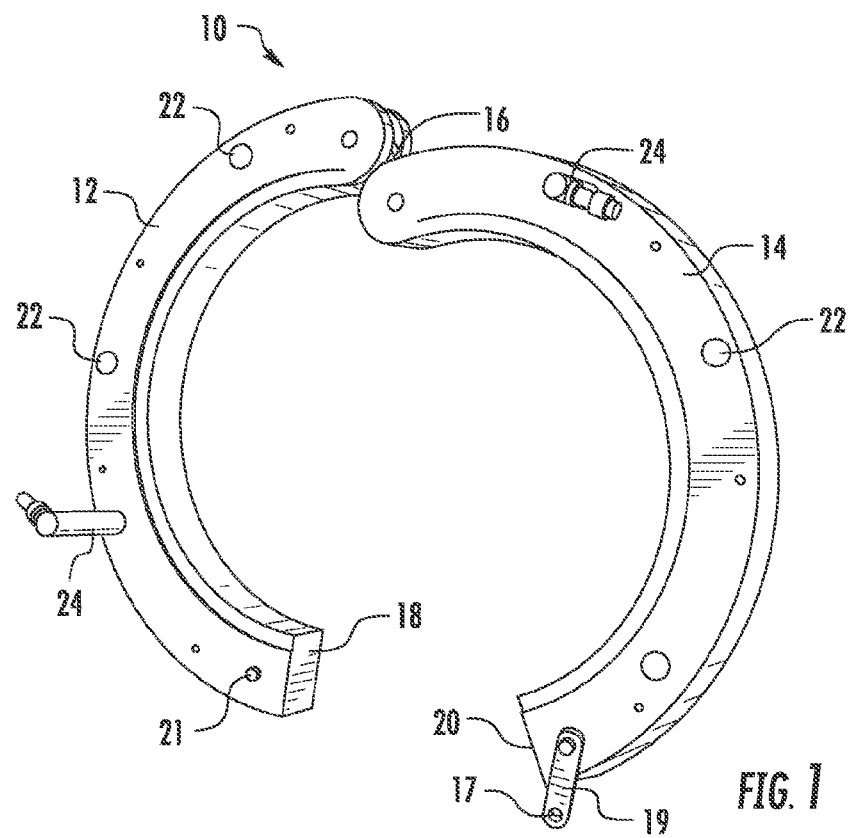
FIG. 1 is a perspective front view of a split ring according to one embodiment, shown assembled with two split ring drive mechanisms.
Figure 2:
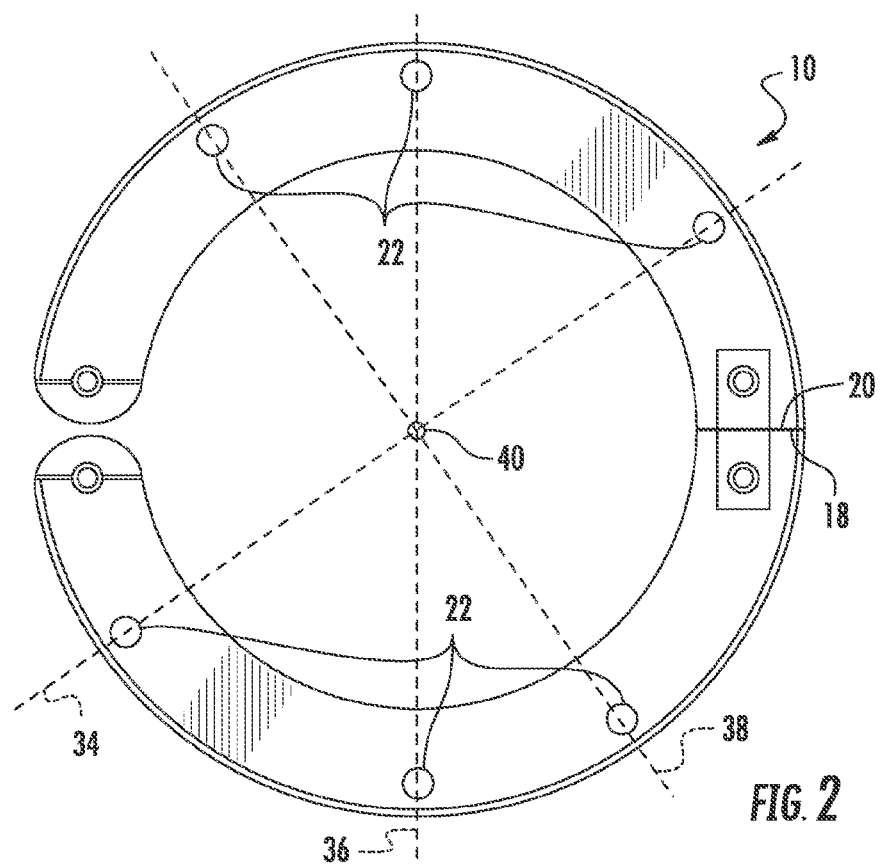
FIG. 2 is a front view of the split ring of FIG. 1, shown in isolation.

One embodiment of a split ring according to the present invention is illustrated in FIGS. 1-6. As shown in FIGS. 1-2, split ring 10 includes a first portion 12 coupled with a second portion 14 by a pivot bar 16 or other suitable hinge. Pivot bar 16 permits first portion 12 to pivot relative to second portion 14. Each of first portion 12 and second portion 14 includes one or more apertures 22. Apertures 22 may be threaded or unthreaded. Apertures 22 are dimensioned to receive any suitable jack or other drive mechanism, such as split ring drive mechanism 24. Split ring drive mechanism 24 may be any suitable mechanical, hydraulic, or pneumatic jack or piston cylinder assembly. In one non-limiting embodiment, split ring drive mechanism 24 is a hydraulic cylinder with a movable piston driven by a pump.

First portion 12 of split ring 10 includes an end 18 that abuts an end 20 of second portion 14 when the split ring 10 is in a closed position (see FIG. 2). An aperture 17 in a bracket 19 on end 18 or 20 cooperates with a protrusion 21 on the other of end 18 or 20 to retain the split ring 10 in the closed position, although various other retention mechanisms can be used to retain the split ring 10 in the closed position. End 18 separates from end 20 as split ring 10 moves from the closed position to an open position (see FIG. 1).

The embodiment illustrated in FIGS. 1-2 includes six apertures 22, three of which are positioned on first portion 12 and three of which are positioned on second portion 14. However, any desired number of apertures may be used to accommodate the dimensions and other properties of the roll with which the split ring will be used. For example, instead of six apertures 22, four apertures, eight apertures, ten apertures or more may be used. In some embodiments, only one aperture 22 is present on each of first portion 12 and second portion 14. In some cases, split ring 10 includes an odd number of apertures 22. The spacing between apertures 22 can vary.

In some embodiments, as illustrated in FIG. 2, each aperture on the first portion 12 is arranged opposite (i.e., approximately 180 degrees from) an aperture on the second portion 14. In other words, the apertures 22 are positioned such that each of longitudinal axes 34, 36, and 38 extending from a center point 40 of the split ring 10 intersect two apertures 22. In some cases, each of longitudinal axes 34, 36 and 38 intersects one aperture 22 on the first portion 12 and one aperture 22 on the second portion 14. Such an arrangement allows split ring drive mechanisms 24 to be positioned opposite one another to counteract each other and allow uniform pressure to be applied and maintained, as explained in more detail below.

Figure 3:
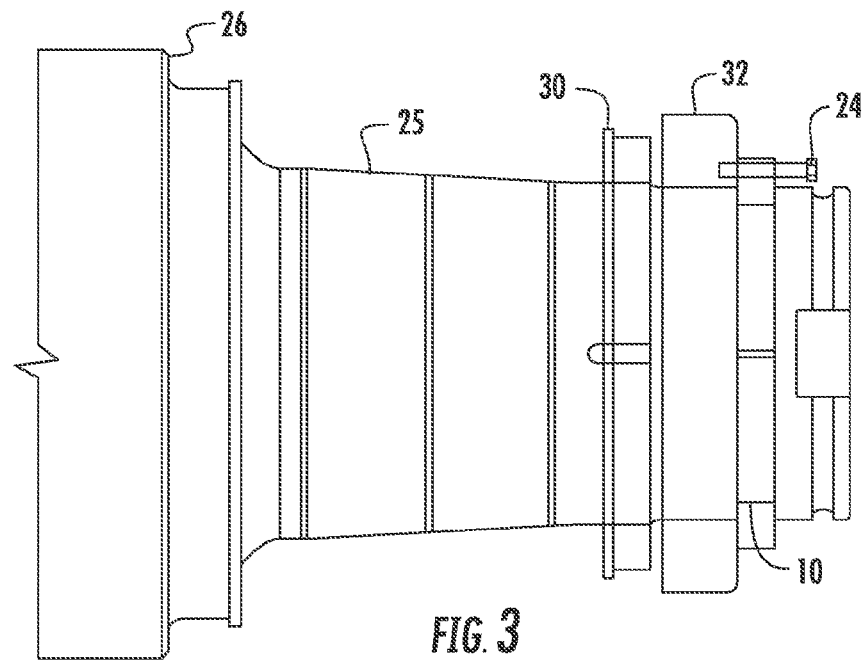
FIG. 3 is a partial schematic side view of an end of a roll assembled with a mounting jack, a bearing retainer, a split ring, and a split ring drive mechanism according to one embodiment.
Figure 4:
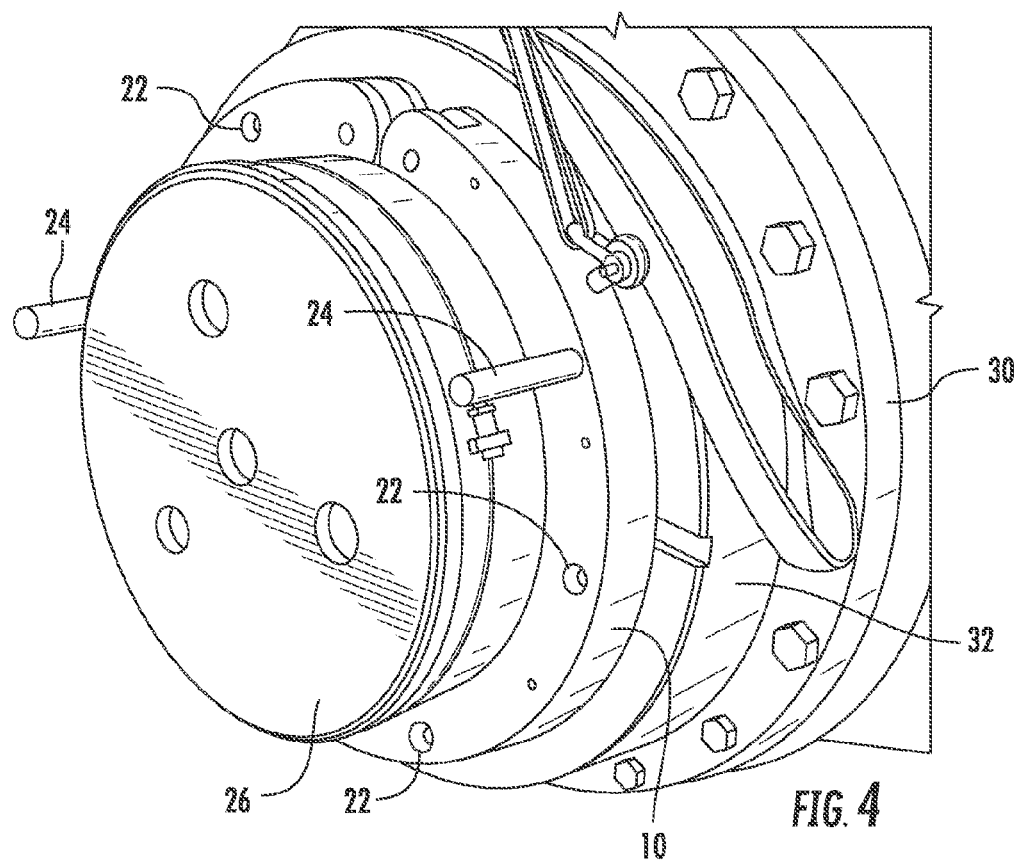
FIG. 4 is a partial perspective view of an end of a roll assembled with a mounting jack, a bearing retainer, a split ring, and two split ring drive mechanisms according to one embodiment.

When assembling or replacing/servicing a roll 26, a bearing retainer 30 containing a plurality of bearings is positioned on the shaft 25 of the roll 26, as shown in FIGS. 3-4. A mounting jack 32 is extended to apply force to the bearing retainer 30 to compress the bearing retainer 30 onto the roll 26. As shown in FIG. 3, split ring 10 is positioned against the mounting jack 32 to act as a back stop and keep the mounting jack 32 in compression with the bearing retainer 30. Once the bearing retainer 30 is assembled onto the roll 26, the mounting jack 32 can be collapsed and removed.

Figure 5:
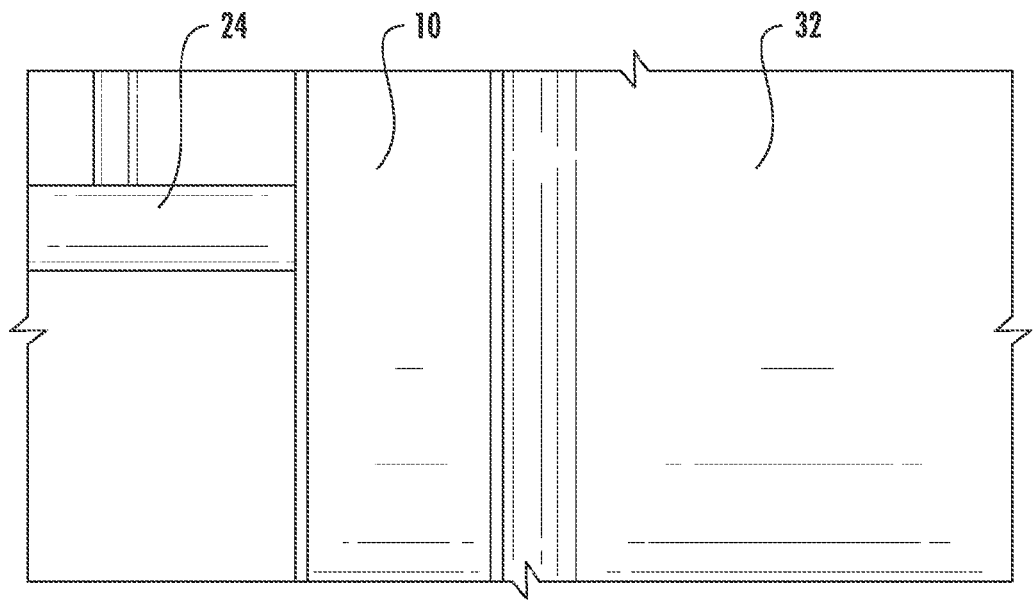
FIG. 5 is a side view of a portion of an end of a roll showing a split ring compressed against a mounting jack.
Figure 6:
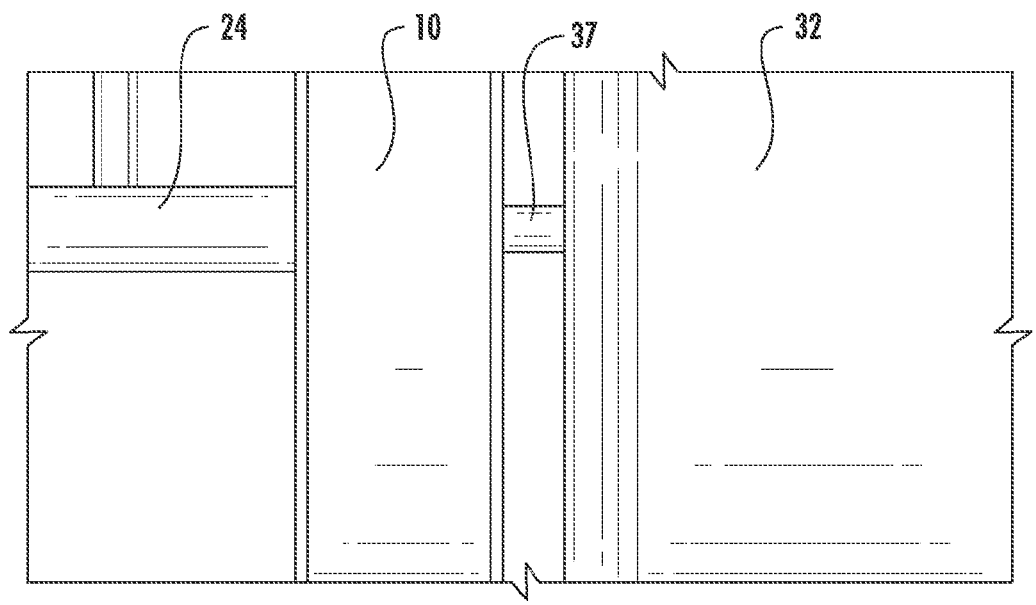
FIG. 6 is a side view of the portion of the end of the roll of FIG. 5, shown as the split ring separates from the mounting jack.

However, once the mounting jack 32 is extended and assembled with the split ring 10, it is difficult to retract it back to its unextended state. To collapse the mounting jack 32, the split ring first needs to be released from the mounting jack 32. According to one aspect of the disclosed improved method, one or more split ring drive mechanisms 24 are inserted into apertures 22 of the split ring 10 to release the split ring 10 from the mounting jack 32. Specifically, activating split ring drive mechanisms 24 applies pressure to the mounting jack 32 and pushes the mounting jack 32 apart from the split ring 10. FIG. 5 illustrates the split ring 10 as it is compressed against the mounting jack 32. Upon activation of split ring drive mechanisms 24, pistons 37 of the split ring drive mechanisms 24 extend and engage the mounting jack 32 to push the mounting jack 32 away from the split ring 10, as shown in FIG. 6. Once the pressure applied by split ring 10 on mounting jack 32 is released, the mounting jack 32 can continue collapsing to its unextended state and ultimately be removed from the roll 26.

In some embodiments, the split ring drive mechanisms 24 are activated by a pump that drives a hydraulic cylinder or other mechanism of the split ring drive mechanisms 24. The pump used to activate the split ring drive mechanisms 24 may be a motorized or manual hydraulic hand pump or any other suitable device to pressurize split ring drive mechanisms 24. As shown in FIG. 4, two split ring drive mechanisms 24 can be used to release the split ring 10, with one positioned within an aperture 22 of first portion 12 and a second positioned within an aperture 22 of second portion 14 of split ring 10. The split ring drive mechanisms 24 may be positioned in apertures 22 that are opposite one another so that split ring drive mechanisms 24 counteract one another to help balance the applied forces and allow for the application of uniform pressure to evenly compress the mounting jack 32. If the piston of one of the split ring drive mechanisms 24 extends faster than the other, or if the process otherwise gets jammed, one or both of the split ring drive mechanisms 24 can be repositioned in a different aperture 22 to help rebalance the forces. Any suitable number of split ring drive mechanisms 24 can be used to compress the mounting jack 32.

Once the pistons 37 of the split ring drive mechanisms 24 have pushed the split ring 10 away from the mounting jack 32, the split ring 10 can be removed from the assembly and the mounting jack 32 can be collapsed and removed from the assembly. The roll 26, with the mounted bearing retainer 30, is then ready to be installed in an appropriate rolling mill or other application. Using split ring 10 and split ring drive mechanisms 24 to collapse the mounting jack 32 is safer, more efficient, and less labor intensive.

The disclosed split rings can be dimensioned for use with any roll, including work rolls, back up rolls, or any other suitable roll. As discussed above, the number and positioning of apertures used with the split ring can be selected based on the diameter and other properties of the roll with which the split ring will be used. Even though the rolls 26 are described as for use in a rolling mill, the disclosed split rings and methods can be used to assemble and service any type of roll and are not limited to use with rolls designed for rolling mills.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of assembling a roll having a shaft, the method comprising:
   positioning a mounting jack on the shaft of the roll;
   positioning a split ring adjacent the mounting jack on the shaft of the roll, wherein the split ring comprises at least a first aperture and a second aperture;
   positioning a first split ring drive mechanism through the first aperture in the split ring;
   positioning a second split ring drive mechanism through the second aperture in the split ring;
   activating the first and second split ring drive mechanisms so that the first and second split ring drive mechanisms collapse the mounting jack away from the split ring, wherein activating the first and second split ring drive mechanisms comprises activating a pump to pressurize the first and second split ring drive mechanisms; and
   removing the split ring from the shaft of the roll.

2. The method of claim 1, wherein the second aperture is opposite the first aperture.

3. The method of claim 1, wherein activating the pump to pressurize the first and second split ring drive mechanisms comprises activating a hand pump or a motorized pump.

4. The method of claim 1, further comprising compressing the mounting jack against a bearing element along the shaft of the roll.

5. The method of claim 1, wherein activating the first and second split ring drive mechanisms comprises activating the first and second split ring drive mechanisms so that the first and second split ring drive mechanisms apply force to the mounting jack in a direction generally parallel to a longitudinal axis of the shaft.

\* \* \* \* \*